United States Patent [19]

Tamada et al.

[11] Patent Number: 4,908,643
[45] Date of Patent: Mar. 13, 1990

[54] AUTOMATIC FOCUSSING ADJUSTING DEVICE

[75] Inventors: Kazukiyo Tamada; Naoki Takatori, both of Tokyo; Tsuneo Yokoyama; Satoshi Mikajiri, both of Omiya; Mineo Kubota; Hiroshi Saito, both of Kofu, all of Japan

[73] Assignee: Fuji Photo Film Co., Ltd., Kanagawa, Japan

[21] Appl. No.: 246,815

[22] Filed: Sep. 20, 1988

[30] Foreign Application Priority Data

Sep. 21, 1987 [JP] Japan .............................. 62-237023
Sep. 21, 1987 [JP] Japan .............................. 62-237024
Sep. 21, 1987 [JP] Japan .............................. 62-237025

[51] Int. Cl.⁴ .......................................... G03B 3/00
[52] U.S. Cl. ................................... 354/400; 354/402; 354/406
[58] Field of Search ............ 354/400, 402, 406, 195.12

[56] References Cited

U.S. PATENT DOCUMENTS

| | | | |
|---|---|---|---|
| 4,694,151 | 9/1987 | Yoshimura | 354/402 |
| 4,697,891 | 10/1987 | Kawai | 354/406 |
| 4,737,813 | 4/1988 | Ishida et al. | 354/406 |
| 4,816,859 | 3/1989 | Maruyama et al. | 354/400 |

*Primary Examiner*—Russell E. Adams
*Attorney, Agent, or Firm*—Birch, Stewart, Kolasch & Birch

[57] ABSTRACT

An automatic focussing adjusting device which detects the amount of de-focussing of an image of an object to perform an automatic focussing adjustment of a taking lens of a camera including a zoom lens. The magnification m of a group of magnification varying lenses in the zoom lens is corrected and the amount of movement $\Delta X$ of a group of focus lenses necessary for focussing is calculated based on a corrected magnification $\alpha \cdot m$, so that a focussing adjustment can be executed. Also, an error in the amount of de-focussing, caused by manufacturing errors in dimensions defining a positional relationship between line sensors and a group of microscopic lenses in a focus detect element is corrected, and based on a correctively calculated amount of de-focussing $\beta \cdot \Delta P$, a focussing adjustment is performed.

17 Claims, 12 Drawing Sheets

AUTOMATIC FOCUSSING ADJUSTING DEVICE

BACKGROUND OF THE INVENTION

1. Field of the Invention

The present invention relates to an automatic focussing adjusting device and, in particular, to an automatic focussing adjusting device which adjusts the automatic focussing of a taking lens of a camera by detecting the amount of de-focussing of an object.

2. Description of the Related Art

There is already known a system in which the amount of de-focussing of an object is detected and, in accordance with the detected de-focussing amount, the focussing of a taking lens of a camera is adjusted.

This system makes uses of the fact that a focussed pattern, formed by the light that has pressed through the upper half section of the taking lens, is out of phase with a focussed pattern formed by the light that has passed through the lower half section of the taking lens on a focal plane when they are out of focus. That is, the amount of out-of-phase is considered to be the amount of de-focussing (amount of out-of-focus) and the focussing is adjusted in accordance with the amount of de-focussing.

Incidentally, the amount of de-focussing of a zoom lens varies with the focal length of the zoom lens and the positional relation of a focus lens group. In FIG. 13, there is shown the structure of the zoom lens Z and, in this figure, A designates a focus lens group, B a varier lens group, C a compensator lens group, and D a master lens group. Here, the lens groups other than the focus lens group A in the zoom lens are referred to as a magnification varying lens group E.

In the above-mentioned structure, a first the focus lens group A is used to perform the focussing adjustment so as to obtain an image Q1. The magnification of the image Q1 is varied by the varier lens group B to provide an image Q2. Further, the movement of the image Q2 is corrected by the compensator lens group C and then after the image Q2 is focussed by the master lens group D on the focal planes of an image pickup device, a focus detection element and the like forms an object image Q3.

The construction of the zoom lens Z, as shown in FIG. 14, can be simplified by the focus lens group A and magnification varying lens group E. FIG. 14(1) shows an in-focus state, FIG. 14(2) shows a state in which the focus lens group A is situated forwardly by a distance $\Delta X$ more than in-focus, a so called forwardly de-focussed state, and FIG. 14(3) shows a state in which the focus lens group A is situated rearwardly by the distance $\Delta X$ more than in-focus, a so called rearwardly de-focussed state. In these figures, a represents "a" distance between the magnification varying lens group E and the image Q1, "b" a distance between the magnification varying lens group E and the image Q3, "fa" the focal length of the focus lens group A, "fe" the focal length of the magnification varying lens group E, and $\Delta P1$, $\Delta P2$ the amounts of de-focussing, respectively.

In FIGS. 14(2) and 14(3), in spite of the fact that the focus lens group A is moved forward or backward by the same amount of movement $\Delta X$ from a reference position in which the focus lens group A is in focus, the amounts of de-focussing provide different values of $\Delta P1$, $\Delta P2$, respectively.

Here, if the focal distance of the zoom lens Z is expressed by "fz", the magnification of the magnification varying lens group E by "m", the focal distance by "fe", and the amount of de-focussing by $\Delta P$, then the amount of movement of the focus lens group A can be represented by the following equation:

$$\pm \Delta X = \frac{\Delta P \cdot fe}{m(mfe \mp \Delta P)} \quad (1)$$

(where, m=fz/fa.)

This is disclosed in detail in laid open Japanese Patent Application No. 58-217907 (Tokkai).

Conventionally, the above-mentioned optical properties of the zoom lens are taken into consideration and the above equation (1) is used to determine the amount of movement of the focus lens group A necessary for performing the focus adjustment.

When the zoom lenses are mass-produced, the individual zoom lenses vary in their magnification m and focal distance fe of the magnification varying lens group in the above equation (1) due to the variations of precision in machining and assembling. In fact, this provides an error in the amount of movement $\Delta X$.

In general, the focal distance of a lens, when actually produced produces an error of $\pm 3\%$ with respect to the design value thereof. Also, distances between the respective lens groups forming the zoom lens yield errors with respect to the design values thereof in assembling, which appear as an error in the focal distance of the whole zoom lens.

As mentioned above, even if the amount of de-focussing $\Delta P$ is detected accurately, the above-mentioned factors cause an error in the amount of movement $\Delta X$ of the focus lens group. Due to this, when the auto-focussing (or, Auto Focus which will be simply referred to as AF) of the zoom lens is controlled with the magnification m and focal distance fe having been previously set as fixed values, focussing can be achieved by a single AF operation but for the above-mentioned error, however, actually several AF operations are necessary for the focussing. That is, the AF control cannot be performed smoothly.

On the other hand, the amount of de-focussing $\Delta P$ is calculated in accordance with the detected output of a focus detect element such as a TCL (Through Camera Lens) module or the like, as will be described in detail later. The TCL module is mainly composed of a group of light receiving elements which are arranged linearly at given intervals, and a group of microscopic lenses (fly eye lenses) which are disposed forwardly by a given distance from the light receiving element group.

In the TCL module, dimensions such as spacings between the adjoining light receiving elements in the light receiving element group, spacing between the light receiving element group and the microscopic lens group, spacings between the optical axes of the adjoining microscopic lenses in the microscopic lens group, and the like, produce manufacturing errors with respect to their design values due to their different machining and assembling precisions, when they are mass-produced.

These manufacturing errors have an effect on the detected output of the focus detect element and thus in the amount of de-focussing $\Delta P$ that is calculated in accordance with the above detected output there is produced an error which is caused by the above-mentioned manufacturing errors in the focus detect element, which, in the end, produces an error in the amount of movement ΔX of the focus lens group obtainable from the equation (1) and necessary for focussing.

This is not limited to the TCL module, but it can also apply similarly to other focus detect elements of a type that detects a focussed state on the focal plane of an object image by means of a group of sensors arranged one-dimensionally or two-dimensionally in a plane vertical to the optical axis in the neighborhood of the focal plane.

However, in the conventional zoom lens automatic focussing adjusting device, the automatic focussing control is performed without giving any consideration to the errors caused by the above-mentioned manufacturing error of the focus detect element and included in the amount of de-focussing ΔP calculated in accordance with the detect output of the focus detect element. Therefore, if the error caused by the manufacturing error of the focus detect element and included in the amount of de-focussing ΔP is large, then the error produced in the amount of movement ΔX of the focus lens group calculated from the equation (1) is also large, so that the focussing cannot be achieved by a single AF operation and, therefore, the AF control cannot be performed smoothly.

SUMMARY OF THE INVENTION

The present invention aims at eliminating the drawbacks found in the above-mentioned conventional automatic focussing adjusting device.

Accordingly, it is a first object of the invention to provide an automatic focussing adjusting device which can achieve focussing rapidly by minimizing the effect of the error of the magnification m of a magnification varying lens group that is produced in manufacturing a zoom lens.

The aforementioned equation (1) showing the relationship between the amount of movement ΔX of the focus lens group and the amount of de-focussing ΔP in the zoom lens can be transformed as follows:

$$\pm \Delta X = \frac{\Delta P}{m^2 \mp \frac{m \cdot \Delta P}{fe}} \quad (2)$$

(where, m=fz/fa).

The errors resulting in the above equation (2) of the zoom lens and produced in the manufacturing process exist in the respective focal distances fa, fe, fz of the focus lens group, the magnification varying lens group and the zoom lens.

Therefore, if all of the focal distances fa, fe, fz are corrected such that their errors can be eliminated, then it is theoretically possible to eliminate the error in the amount of movement of the focus lens group caused by these errors. Such correction, however, is very complicated and thus is not practical.

In view of this, according to the present invention, in equation (2), the magnification m of the magnification varying lens group which provides the greatest factor of the error in the amount of movement ΔX is corrected for each zoom lens to thereby achieve a smooth (or high-speed) AF control of the zoom lens.

In order to attain the above object, according to the invention, there is provided an automatic focussing adjusting device comprising focus detect means for detecting the focussed state of an object focussed on a focal plane by the incident light of the zoom lens; lens drive means for driving the focus lens group of the zoom lens; and control means for calculating the amount of de-focussing ΔP in accordance with the detect output of the focus detect means, for obtaining the amount of movement ΔX of the focus lens group necessary for focussing on the focal plane from the amount of de-focussing ΔP, the magnification m of the magnification varying lens group of the zoom lens and the focal distance fe thereof, and for outputting to the lens drive means a control signal to move the focus lens group by the amount of movement ΔX, characterized in that there is provided correction coefficient setting means for setting a correction coefficient α for the magnification m of the magnification varying lens group and also that the control means takes in the set output of the correction coefficient setting means and lets the magnification m of the magnification varying lens group be a·m to calculate the amount of movement ΔX of the focus lens group.

In operation, in the automatic focussing adjusting device in accordance with the invention, the correction coefficient α peculiar to each of the zoom lenses is set by the correction coefficient setting means.

The control means that takes in the set output of the correction coefficient setting means for setting the correction coefficient α is operated to let the magnification m of the magnification varying lens group be a·m so as to calculate the amount of movement of the focus lens group necessary for focussing.

Here, the correction coefficient α is set so as to be able to absorb the variations (errors with respect to the design values) of the focal distances fa, fz of the focus lens group and zoom lens that are peculiar to the respective zoom lenses and as a result of this, the variations of these focal distances fa, fz, that is, an error in the amount of movement ΔX of the focus lens group caused by the variations of the magnification m of the magnification varying lens group can be minimized, whereby the automatic focussing adjustment of the zoom lens can be controlled smoothly and at high speeds.

It is a second object of the invention to provide an automatic focussing adjusting device which can achieve a high speed focussing by minimizing the influences of error in the amount of de-focussing ΔP caused by a manufacturing error in the dimensions defining the positional relationship between line sensors and microscopic lenses in a focus detect element such as a TCL module or the like.

In attaining the above object, according to the invention, there is provided an automatic focussing adjusting device comprising: two line sensors for outputting electric signals corresponding to the distribution of illumination of an object image focussed on a light receiving surface; a group of microscopic lenses for focussing on the two opposed line sensors an object image formed by the light that has passed through two sections which are symmetric to an optical axis on the light leaving pupil surface of a taking lens; and, control means for calculating converting the amount of divergence in the illumination distribution of the object image on the light receiving surfaces of the two line sensors to the amount of de-focussing ΔP with respect to the focal plane of the taking lens, and for performing a focussing control in accordance with the amount of de-focussing ΔP, characterized in that there is provided correction coefficient setting means for setting a correction coefficient β which is used to correct an error in the amount of de-focussing caused by the variations of the dimensions defining the mutual relationship between the group of microscopic lenses and the two line sensors, when the above-mentioned amount of de-focussing ΔP is calculated, and also that the control means takes in the set output of the correction coefficient setting means to correct and calculate the amount of de-focussing ΔP and executes the focussing control in accordance with the corrected amount of de-focussing $\beta \cdot \Delta P$.

In operation, in the automatic focussing adjusting device according to the invention, the correction coefficient $\beta$, which is used to correct the error in the amount of de-focussing ΔP caused by the manufacturing errors in the dimensions defining the positional relationship between the two line sensors and the group of microscopic lenses used as focus detect means, is set by the correction coefficient setting means.

The set output of the correction coefficient setting means is taken in by the control means and, in the control means, a correction operation is made on the amount of de-focussing ΔP calculated based on the detect outputs of the two line sensors, and, based on the corrected amount of de-focussing $\beta \cdot \Delta P$, the amount of movement ΔX of the taking lens necessary for focussing is calculated.

Accordingly, since the error in the amount of de-focussing ΔP caused by the manufacturing errors in the dimensions defining the positional relationship between the two line sensors and the group of microscopic lenses and thus the error in the amount of movement ΔX of the taking lens can be eliminated by setting the correction coefficient $\beta$ the automatic focussing control can be achieved at high speeds.

Also, referring to the before-mentioned equation (2), the magnification m of the magnification varying lens group that provides the greatest factor of the error in the amount of movement ΔX may be corrected for each of the zoom lenses and, at the same time, the manufacturing errors in the dimensions defining the positional relationship between the light receiving elements and microscopic lens group may be corrected. Here, if a correction coefficient for the magnification m of the magnification varying lens group is expressed as $\alpha$ and a correction coefficient for the amount of de-focussing ΔP due to the above-mentioned manufacturing errors of the focus detect element is expressed as $\beta$, then m can be represented by $\alpha m$ and ΔP can be represented by $\beta \Delta P$ in the equation (2), so that the following equations can be obtained:

$$\pm \Delta X = \frac{\beta \Delta P}{\alpha^2 m^2 \mp \frac{\alpha m \cdot \beta \Delta P}{fe}} \quad (3)$$

$$\therefore \Delta X = \frac{\Delta P}{\frac{\alpha^2}{\beta} m^2 \mp \frac{\alpha m \Delta P}{fe}} \quad (4)$$

Here, if a correction coefficient $(\alpha^2/\beta)$ in the first term of the denominator in the right side of the equation (4) is expressed as $\gamma$, then the equation (4) can be transformed as follows:

$$\pm \Delta X = \frac{\Delta P}{\gamma m^2 \mp \frac{\alpha m \Delta P}{fe}} \quad (5)$$

It is a third object of the invention to provide an automatic focussing adjusting device which eliminates the influences of an error in the magnification m of the magnification varying lens group produced in the production process of the zoom lens on the amount of movement ΔX of the focus lens group and the influences of the error in the amount of de-focussing ΔP caused by the manufacturing errors in the dimensions defining the positional relationship between the group of light receiving elements and the group of the microscopic lenses in the focus detect element with respect to the above equation (5) by setting the correction coefficients $\alpha$ and $\gamma$ so as to be able to achieve a high speed focussing.

In order to attain the above object, according to the invention, there is provided an automatic focussing adjusting device, comprising: focus detect means including a group of light receiving elements arranged linearly at given intervals and a group of microscopic lenses disposed in front of and at given distances from the light receiving element group in the direction of the optical axis of an optical system for focus adjusting for detecting the focussed state on a focal plane of an object focussed by the incident light of the zoom lens; lens drive means for driving a group of focus lenses of the zoom lens; and, control means for calculating the amount of de-focussing ΔP in accordance with the detect output of the focus detect means, for obtaining the amount of movement ΔX necessary for focussing on the focal plane according to the amount of de-focussing ΔP, the magnification m of the magnification varying lens group of the zoom lens and the focal distance fe thereof, and for outputting to the lens drive means a control signal for moving the focus lens group by the amount of movement ΔX, characterized in that there are provided a first correction coefficient setting means for setting a correction coefficient $\alpha$ for the magnification m of the magnification varying lens group, and a second correction coefficient setting means for setting a correction coefficient $\beta$ to eliminate the influence of the error in the amount of de-focussing ΔP, which is caused by the error in the magnification m of the magnification varying lens group and the manufacturing errors in the dimensions defining the positional relationship between the light receiving element group and microscopic lens group of the focus detect means, on the amount of movement ΔX, and also that the control means takes in the set outputs of the first and second correction coefficient setting means and executes the correction operations in accordance with the set outputs so as to calculate the amount of movement ΔX of the focus lens group.

In operation, in the automatic focussing adjusting device according to the invention, the correction coefficients $\alpha$ and $\gamma$, which are used to eliminate the influence of the error in the amount of de-focussing ΔP caused by the error in the magnification m of the magnification varying lens group and the manufacturing errors in the dimensions defining the positional relationship between the light receiving element group and microscopic lens groups of the focus detect means on the amount of movement ΔX of the focus lens group necessary to bring the zoom lens into focus, are set by the corresponding correction coefficient setting means thereof, respectively.

The set outputs of the correction coefficients $\alpha$, $\gamma$ are received by the control means and, in the control means, the correction operations are executed in accordance with the correction coefficients $\alpha$, $\gamma$, so that the amount of movement ΔX of the focus lens group is calculated.

Here, since the correction coefficient α is set so as to be able to absorb the error in the magnification of the magnification varying lens group and the correction coefficient γ is set so as to be able to absorb the variations (errors with respect to the design values) of the focal distances fa, fz of the focus lens group, zoom lens peculiar to the individual zoom lenses as well as manufacturing errors in the dimensions defining the positional relationship between the light receiving lens group in the focus detect means, the error in the amount of movement of the focus lens group caused by the above-mentioned errors can be minimized and, therefore, the automatic focussing of the zoom lens can be controlled smoothly and at high speeds.

Also, it has been confirmed experimentally that the correction coefficient takes a value in the range of $0.90 \leq \alpha \leq 1.10$. Then, in equation (5), if $\alpha \simeq 1$, then the equation can be transformed as follows:

$$\pm \Delta X = \frac{\Delta P}{\gamma m^2 \mp \frac{m \Delta P}{fe}} \qquad (6)$$

It is a fourth object of the invention to provide an automatic focussing adjusting device which can eliminate the influence of the error in the amount of de-focussing ΔP caused by the error in the magnification m of the magnification varying lens group produced in the manufacturing process of the zoom lens and by the manufacturing errors in the dimensions defining the positional relationship between the light receiving group and microscopic lens group in the focus detect element on the amount of movement ΔX of the focus lens group by making the correction coefficient α approximate to $\alpha \simeq 1$ and setting the correction coefficient γ only so as to achieve a high speed focussing.

In achieving the above object, according to the invention, there is provided an automatic focussing adjusting device, comprising: focus detect means including a group of light receiving elements arranged linearly at given intervals and a group of microscopic lenses disposed in front of and given distances from the light receiving element group in the direction of the optical axis of an optical system for focussing adjusting for detecting the focussed state on a focal plane of an object focussed by the incident light of the zoom lens; lens drive means for driving the focus lens group of the zoom lens; and, control means for calculating the amount of de-focussing ΔP in accordance with the detect output of the focus detect means, for finding the amount of movement ΔX of the focus lens group necessary for focussing on the focal plane according to the amount of de-focussing ΔP, the magnification m of the magnification varying lens group of the zoom lens and the focal distance fe thereof, and for outputting to the lens drive means a control signal to move the focus lens group only by the amount of movement ΔX, characterized in that there is provided correction coefficient setting means for setting a correction coefficient γ for correcting and eliminating the influence of the error in the amount of de-focussing ΔP, which is caused by the error in the magnification m of the magnification varying lens group and the manufacturing errors in the dimensions defining the positional relationship between the light receiving element group and microscopic lens group of the focus detect means, on the amount of movement ΔX, and also that the control means takes in the set output of the correction coefficient setting means and executes a correction operation in accordance with the set output to thereby calculate the amount of movement ΔX of the focus lens group.

In operation, in the automatic focussing adjusting device according to the invention, the correction coefficient α for correcting the error in the magnification of the magnification varying lens group is made to approximate $\alpha \simeq 1$ and only the correction coefficient γ is set. In the control means, the correction operation is carried out in accordance with the correction coefficient γ to thereby calculate the amount of movement ΔX of the focus lens group.

In this case, when compared with the case where the correction operations are carried out in accordance with the two correction coefficients α, γ, the error included in the amount of movement ΔX of the focus lens group calculated is slightly larger, but, due to the fact that only the correction coefficient γ is set, the construction of the device can be advantageously simplified.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein:

FIG. 11 is a graph showing the relationship between the CCD line sensors and fly eye lenses and main light rays;

DETAILED DESCRIPTION OF THE INVENTION

The detailed description of the preferred embodiments of an automatic focussing adjusting device according to the present invention will hereunder be given with reference to the accompanying drawings.

Figure 1:
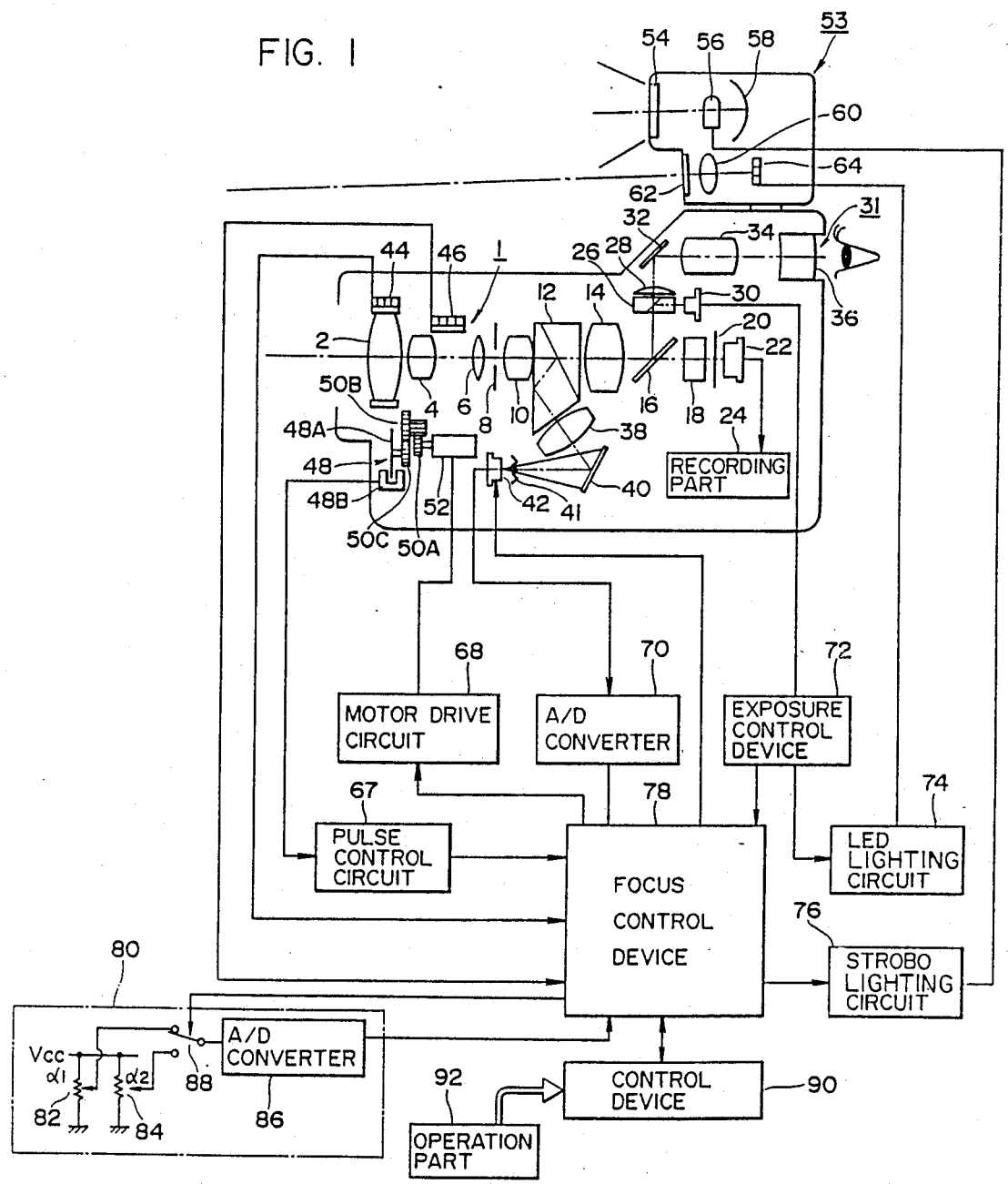
FIG. 1 is a block diagram of the structure of an embodiment of a camera including an automatic focussing adjusting device according to the present invention.

Referring first to FIG. 1, there is shown the structure of an embodiment of a camera including therein an automatic focussing adjusting device according to the invention. In FIG. 1, a zoom lens system 1 as shown comprising a group of focus lenses 2 for focussing an image of an object, a group of varier lenses 4 for varying a focal distance, a group of compensator lenses 6 for compensating focal divergencies which are caused by the movement of the varier lens group 4, and groups of master lenses 10, 14. A stop diaphragm 8 is interposed between the compensator lens group 6 and master lens group 10. Also, there is interposed a beam splitter 12 between the master lens groups 10 and 14.

The focus lens group 2 is held by a first inner cylinder which is not shown, and the inner cylinder is arranged to communicate with a first outer cylinder and is held by the first outer cylinder. By rotating the first outer cylinder, the focus lens group 2 can be moved in an optical axis direction. The first outer cylinder can be rotated by a DC motor 52. The DC motor 52 is configured such that it can be rotationally driven by a drive signal which is output from a motor drive circuit 68. The absolute position of the focus lens group 2 that is moved to a predetermined position with the rotational movement of the first outer cylinder can be examined by the position data represented by a grey code which is output from a focus lens position detect part 44 provided in the first outer cylinder. The position data represented by the grey code is created by a pattern electrode formed in the focus lens position detect part 44, and the position data representing the moving position of the focus lens group 2 is output to a focus control device 78.

The focus control device 78 is a device which generally controls the whole automatic focussing adjusting mechanism and it is composed of a memory for storing programs and data necessary for execution of focus control, a CPU, and interfaces for connecting the mechanism to peripheral elements, circuits, devices and the like.

On the other hand, a small-size gear 50A is fixed to the shaft of rotation of the DC motor 52, and the first outer cylinder can be rotated by means of a gear 50B intermeshing with the gear 50A. The amount of rotation of the first outer cylinder is detected by an encoder 48 which includes a disc 48A provided with a large number of radially formed slits and a photo interrupter 48B. The disc 48A is fixed to a gear 50C intermeshing with the gear 50B and the outer peripheral portion of the disc 48A is inserted into a recess in the photo interrupter 48B. A pulse signal, which is output from the photo interrupter 48B with the rotation of the disc 48A, is input to a pulse count circuit 67, in which the number of pulses thereof is counted. The count value data that is output from the pulse count circuit 67 is fed on an input to the focus control device 78.

Alternatively, the amount of movement of the focus lens group may be detected by a detector which counts the number of slits in a disc with slits for the amount of rotation of the DC motor and the detected values may correspond to the amounts of movement of the focus lens group.

The varier lens group 4 and compensator lens group 6 are both held by a second inner cylinder, not shown, and are also arranged to communicate with a second outer cylinder. The second outer cylinder is formed in the inside thereof with a cam groove in which there is positioned a pin projected on and from the outer side of the second inner cylinder. While the magnification of the zoom lens is varied with the rotation of the second outer cylinder, the object image is always focussed on the light receiving surface of a CCD 22. The magnification of the zoom lens can be examined from the zoom information, in the present embodiment, the focal distance $f_z$ of the zoom lens that is output in the form of a grey code from a zoom lens detect part 46 provided in the second outer cylinder. The zoom information output from the zoom lens detect part 46 is input to the focus control device 78.

Figure 11:
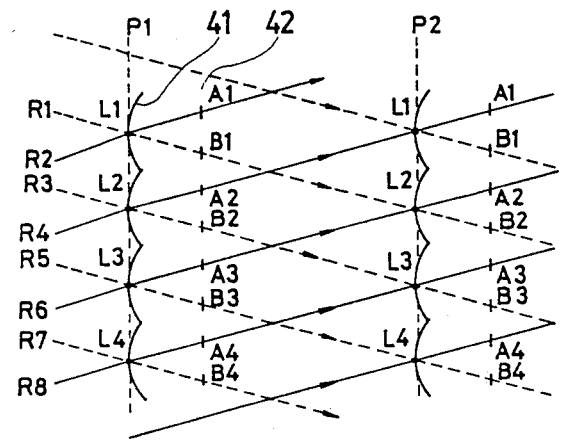
FIGS. 11 and 12 are graphs which are illustrative of the principle that, by means of combination of the CCD line sensors with the fly eye lenses, the same illumination distribution of an image of an object is detected in a spatially out-of-phase state by the two groups of light receiving elements of the CCD line sensors when out of focus; and, in particular.

The beam splitter 12 separates a portion of the incident light in a given direction and the separated light is passed through a lens 38 for AF (Auto Focus), a reflex mirror 40 and a fly eye lens 41 and is received by a CCD line sensor 42 for AF. The CCD line sensor 42, as shown in FIG. 11, includes two groups, i.e., A and B groups of CCD light receiving elements which are arranged at given intervals, and, from the respective light receiving elements in A and B groups, there can be obtained signals which correspond to the illumination distribution of the object image on the light receiving surfaces thereof. In each of A and B groups, for example, there are provided 24 light receiving elements. One light receiving element in A group and one right receiving element in B group (for example, A1 and B1) form a pair and in front of such pair there is disposed a fly eye lens (L1). Therefore, in this example, 24 fly eye lenses are arranged successively. The output signal from the CCD line sensor 42 is converted by an A/D converter 70 to a digital signal, for example, of 8 bits, and after then it is input to the focus control device 78. The CCD line sensor 42 is driven and controlled by the focus control device 78 and, for example, the gate time thereof can be controlled according to the amount of light that is received by the CCD light sensor.

The opening of the stop diaphragm 8 is adjusted by a servo motor not shown, which is driven and controlled by an exposure control device 72.

The light that has passed through the zoom lens system is reflected 90° upwardly by a reflex mirror 16 and is allowed to enter a beam splitter 26. The reflex mirror 16 is adapted to jump up during photographing, whereby the incident light can be focussed through a low-pass filter 18 and a shutter 20 on the light receiving surface of a CCD 22 for photographing. Electric charges corresponding to the object images are accumulated in the light receiving surface of the CCD 22 and the electric signals that correspond to the electric charge patterns are output to a recording part 24.

The low-pass filter 18 is provided to remove the unnecessary components of the incident light so as to prevent interference fringes from occurring, and the shutter 20 is used to adjust the light receiving time of the CCD 22. Also, the recording part 24 is configured such that it creates a video signal representing the object image in accordance with the input signal thereof and also records the video signal into a recording medium such a a magnetic disc and the like.

The light that has entered the beam splitter 26 is, as it is, directed through a focussing lens 28 to a finder optical system, and a part of the beam splitter 26 is received by a light receiving element 30.

The electric signal that has been converted photoelectrically by the light receiving element 30 is input to the exposure control device 72 and the exposure control device 72 controls the stop value of the stop diaphragm 8 and the shutter speed of the shutter 20 in accordance with this input signal.

The finder optical system 31 comprises a reflex mirror 32, a relay lens 34 and an eyepiece 36.

On the top portion of the camera main body there is provided a strobo-light 53. The strobo-light 53 comprises a Fresnel lens 56, a discharge tube 56 which can be lighted by a strobe lighting circuit 76, and a concave reflex mirror 58.

Also, within the main body of the strobo-light 53, there is provided a light emitting element 64 which can be used as an auxiliary light when the light of field is low, in the automatic focussing adjustment.

The correction coefficient setting circuit 80 is a circuit which sets a correction coefficient $\alpha$ for correcting the magnification m of the magnification varying lens group (the lens system group exclusive of the focus lens group 2 in the zoom lens) and, in the present embodiment, it is composed of potentiometers 82, 84, an A/D converter 86 for A/D converting the output signals of the potentiometers 82, 84, and an analog switch 88.

The correction coefficient $\alpha$ is set such that, in a state in which the focal distance fz is set at a fixed value so as to be able to achieve focussing by one AF operation for each zoom lens, a difference exists between the theoretical and actual values of the amount of movement $\Delta X$ of the focus lens group 2. In this case, since the characteristics of the amount of movement $\Delta X$ of the focus lens group 2 with respect to the correction coefficient $\alpha$ are different in a so called forward focussed state and backward focussed state, as will be discussed later, the correction coefficient $\alpha$, a value $\alpha_1$ to be set by the potentiometer 82 is used for operation of the amount of $\Delta X$ for the forward focussed state, while, for the backward focussed state, a value $\alpha_2$ to be set by the potentiometer 84 is used.

On the other hand, in a memory (ROM) with the focus control device 78, there are stored in a table the value of the magnification m of the magnification varying lens group corresponding to the focal distance fz of the zoom lens to be detected from the zoom lens detect part 46, and the value of the focal distance fe of the magnification varying lens group. The focus control device 78 receives the output signals from the A/D converter 70 and correction coefficient setting circuit 80, refers to the table stored in the ROM to calculate the amount of movement $\Delta X$ of the focus lens group 2, and drives and controls the DC motor 52 through the motor drive circuit 52 so as to perform the automatic focussing adjustment. In addition to this, the focus control device 78 also drives and controls the CCDs 20, 42.

The control device 90 is a device which generally controls the main body of the camera and, to the control device 90, there is connected an operation part 92 for operating a power switch, a shutter release button and the like, a display part (not shown) for displaying various data, and other parts.

Figure 2:
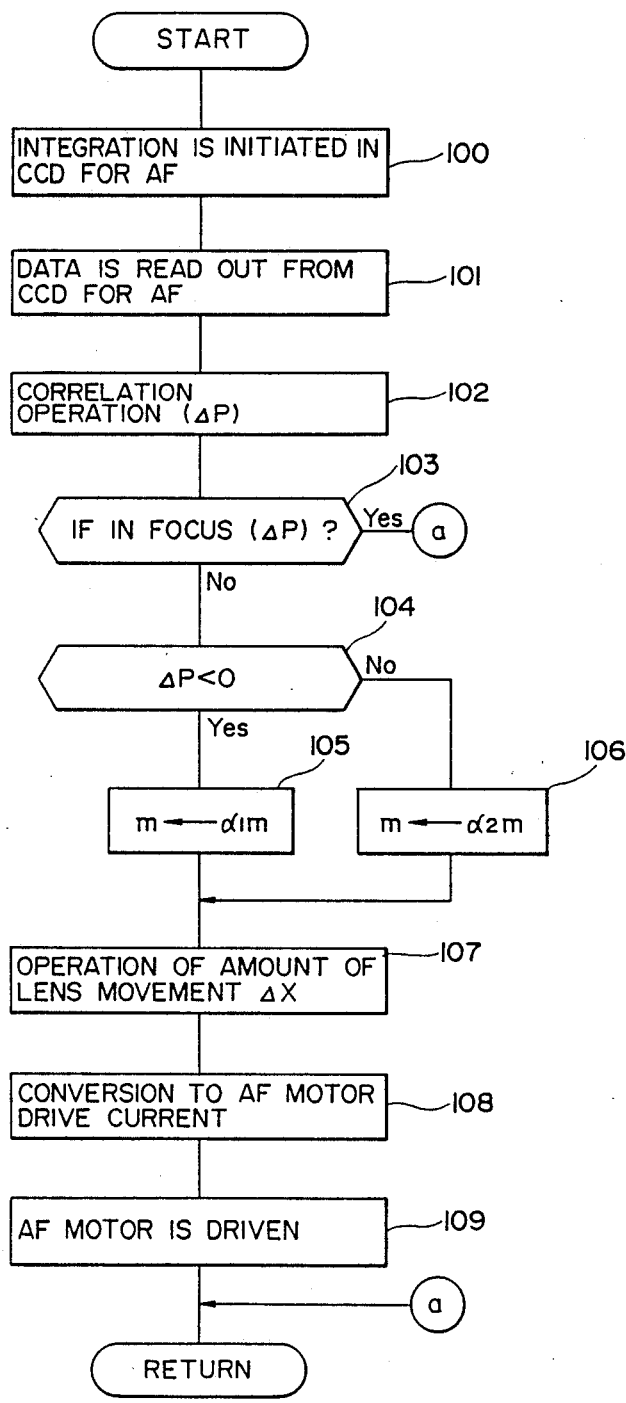
FIG. 2 is a flow chart to show the control operation of a focus control device shown in FIG. 1.

Next, a description will hereinafter be given of the control operation to be performed by the focus control device in the automatic focussing adjustment of FIG. 2. In this figure, if the shutter 20 is released by means of operation of the shutter release button in the operation part 92, the light, the amount of which corresponds to the object image, is allowed to enter the light receiving surfaces of the CCDs 22, 40 to open the gates of the CCDs 22, 40, thereby initiating an accumulation (integration) of the signal charges (Step 100). The output of the CCD 22 is not directly related to the automatic focussing adjustment and, therefore, the description thereof is omitted here.

From the CCD line sensor 42, there are obtained two kinds of output signals respectively from A group of light receiving elements (A1, A2, ..., A24) and B group of light receiving elements (B1, B2, ..., B24). In FIG. 11, a dotted line represents a ray of light which has passed through the upper half section of the taking lens (zoom lens), while a solid line represents a ray of light which has passed through a lower half section of the taking lens. Specifically, in FIG. 11, there is shown a state in which the fly eye lens 41 is removed from a focussing position P1 to a focussing position P2. In this figure, two rays of light (for example, R1, R2), which have respectively been emitted from the same point of the object and have respectively passed through the upper and lower half sections of the taking lens at the focussing position P1, intersect each other on the surface of the fly eye lens 41 and are received by the corresponding light receiving elements (for example, A1, B1), respectively (if focussing is achieved at the focussing point P1).

Let us consider a case where the focussing position is moved to P1. Take the lens L2 as an example. At the focussing position P1, the rays of light R3 and R4 intersect with each other and are then received by the light receiving elements B2 and A2 respectively, while, if the focussing position is moved to P2, the rays of light R1 and R6 are received by the light receiving elements B2 and A2, respectively.

Figure 12:
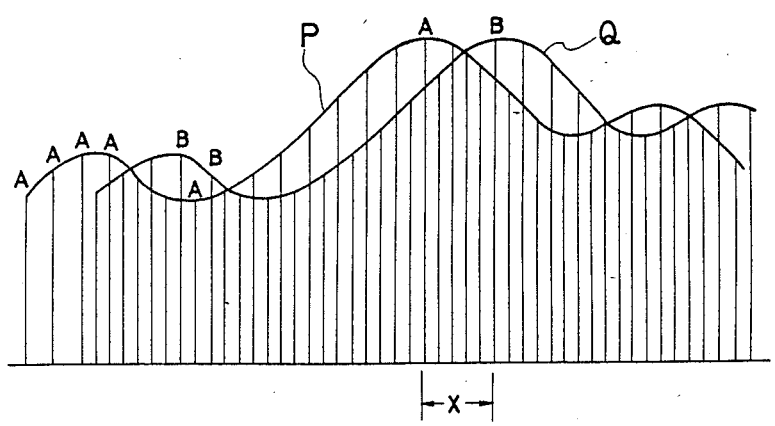
Figure 13:
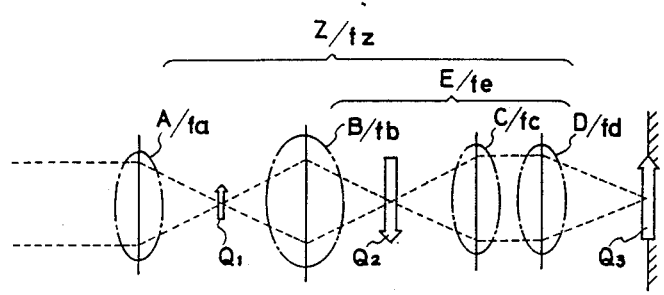
FIG. 13 is an explanatory diagram showing how the object image is focussed by the respective lens groups of a zoom lens; and, FIG. 14 is a diagram illustrative of the relationship between the amount of de-focussing in the zoom lens and the amount of movement of the focus lens group.

In other words, as shown in FIG. 12, the distribution P of the illuminations of the object images received by the respective light receiving elements in A group and the distribution of the illuminations of the object images received by the respective light receiving elements are shifted in space from each other when the taking lens system is not in focus in a given focal plane.

In this manner, the signal charges that correspond to the illumination distributions P, Q are accumulated in the respective light receiving elements in A group and in the respective light receiving elements in B group, and are then read out (Step 101).

Figure 14:
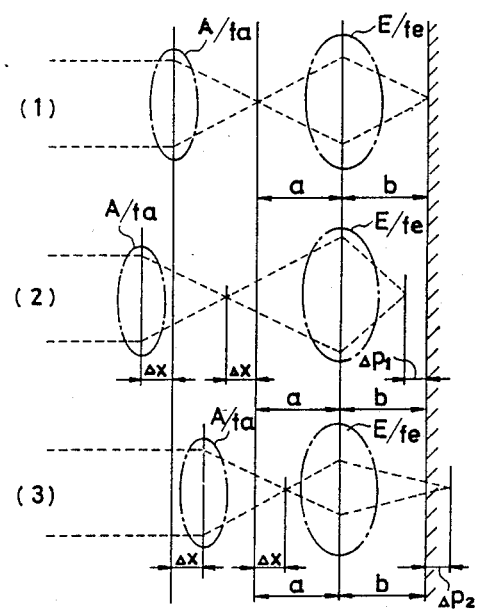

Next, in accordance with the output signals of the respective light receiving elements in A and B groups of the CCD line sensor 42 mentioned above, a correlation operation is made as to the illumination distributions P, Q of the object images to thereby calculate the amount of spatial phase shift X and in in turn the amount of de-focussing $\Delta P$ (see FIG. 14) (Step 102). The amount of phase shift X has a given relationship with respect to the amount of de-focussing $\Delta P$, but since this is not related directly to the subject matter of the present invention, the description thereof is omitted here.

Further, in Step 103, it is determined whether, on the light receiving surface of the CCD 22, the object image is or is not in focus, that is, whether or not $\Delta P = 0$. If in focus ($\Delta P = 0$), then the AF control operation is completed.

On the other hand, if not in focus ($\Delta P \neq 0$), whether or not $\Delta P < 0$ (in the forwardly focussing position) is determined (Step 104). If $\Delta P < 0$ or in the forward focussing position, then the correction coefficient $\alpha_1$ to be set by the potentiometer 82 is input to the focus control device 78 through the analog switch 88 and A/D converter 86, while, if $\Delta P > 0$ or in the rearward focussing position, then the correction coefficient $\alpha_2$ to be set by the potentiometer 84 is input. When the magnification m of the magnification varying lens group of the zoom lens in the equation (2) is expressed by $\alpha \cdot m$, then the following equation can be obtained:

$$\pm \Delta X = \frac{\Delta P}{\alpha^2 m^2 \mp \alpha m \cdot \frac{\Delta P}{fe}} \quad (7)$$

Further, when $P = K$, $m^2 = a$, $m \cdot (\Delta P / fe) = b$, then the equation (7) can be represented as follows:

$$\pm \Delta X = \frac{K}{a\alpha^2 \mp b\alpha} \quad (8)$$

Figure 3:
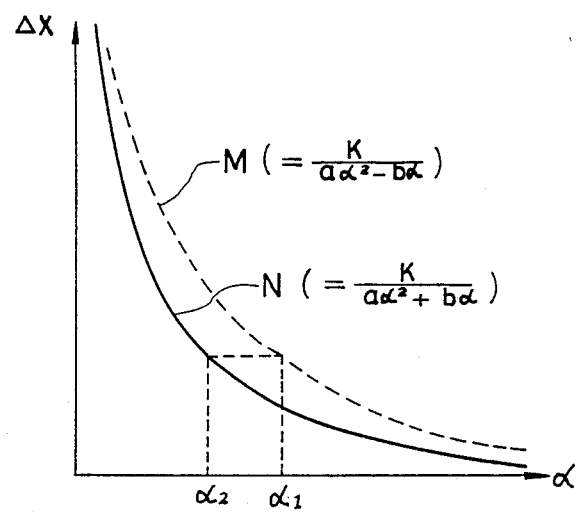
FIG. 3 is a characteristic curve illustrative of the relationship between a correction coefficient α and the amount of movement ΔX of a focus lens group.

In the equation (8), the sign of the denominator is $-$ for a forward focussing state, while it is $+$ for a rearward focussing state. For this reason, as shown in FIG. 3, two hyperbolas M, N are obtained. The hyperbola M, which indicates the characteristic of the forward focussing state, is given by an equation, $$\Delta X = \frac{K}{a\alpha^2 - b\alpha},$$

while the hyperbola N indicating the characteristic of the rearward focussing state is given by an equation, $$-\Delta X = \frac{K}{a\alpha^2 + b\alpha}.$$

As can be seen clearly from FIG. 3, since the characteristic of $\Delta X$ necessary for focussing of the focus lens group with respect to the correction coefficient $\alpha$ in the case of the forward focussing state is different from that in the case of the rearward focussing state, it is necessary to select the difference correction coefficients $\alpha_1$, $\alpha_2$ according to the respective focussing state. Our experiments confirm that it is best to select the correction coefficient $\alpha$ in the range of $0.90 \leq \alpha \leq 1.10$.

The focus control device 78 retrieves the table of the ROM from the focus fz of the zoom lens obtained from the zoom detect parts 46 to obtain the data on the magnification m of the magnification varying lens group on the focal distance fe, and at the same time it sets the correction coefficient of the magnification m $\alpha = \alpha_1$ or $\alpha = \alpha_2$. This is equivalent to setting $m = \alpha_1$ or $m = \alpha_2$ in the equation (2) to operate the amount of movement $\Delta X$ of the focus lens group 2 according to the equation (7) (Steps 105, 106, 107).

The amount of movement $\Delta X$ of the focus lens group 2 is converted to the drive current value of the DC motor 52 which drives the focus lens group 2, and the focus control device 78 outputs to the motor drive circuit 68 a control signal which allows the motor drive circuit 68 to supply the DC motor 52 a current corresponding to the above-mentioned drive current value, thereby executing the automatic focussing adjustment (Steps 108, 109).

As described above, in the present embodiment the correction coefficient setting circuit 80 is realized by the potentiometer and the A/D converter 86. However, this is not always limitative, for example, the correction coefficient $\alpha$ may be set by use of a dip switch and may be input to the focus control device in the form of a digital signal.

In the present embodiment, since the correction coefficient $\alpha$ of the magnification m of the magnification varying lens group of the lens group varies in value according to the forward focussing state and rearward focussing state, it is possible to minimize the error in the amount of movement $\Delta X$ of the focus lens group necessary for focussing.

As discussed above, according to the above-mentioned embodiment of the invention, since the magnification m of the magnification varying lens group, which provides the most influential factor to cause an error in the amount of the movement $\Delta X$ of the focus lens group necessary for focussing in achieving the automatic focussing adjustment by use of the zoom lens can be corrected for each of the zoom lenses, it is possible to minimize the influence due to the error in the magnification m of the magnification varying lens group that would be produced in the manufacturing process and also the automatic focussing adjustment can be made at high speeds even when the error in the magnification m is great.

Figure 4:
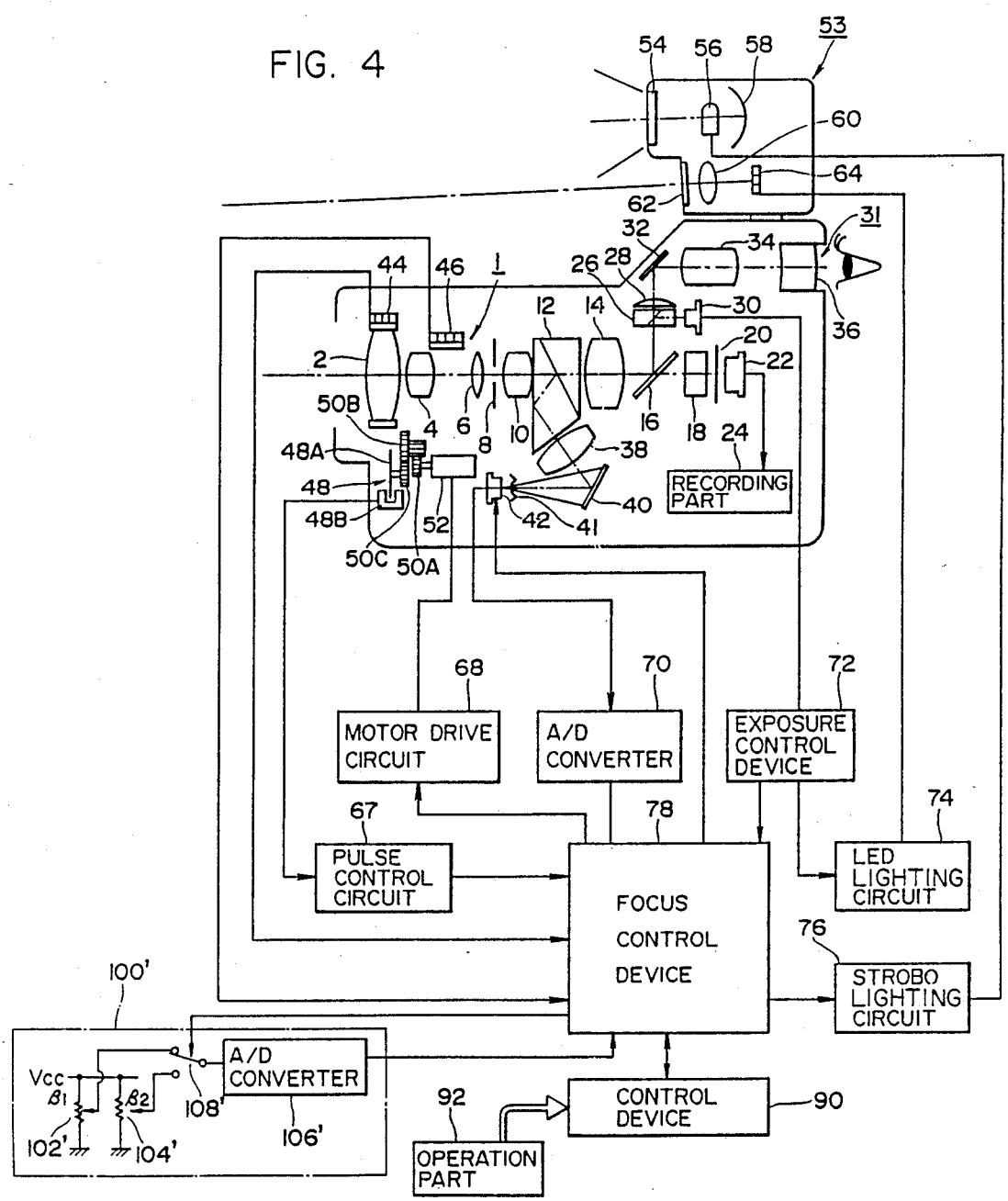
FIG. 4 is a block diagram of the structure of another embodiment of a camera including an automatic focusing adjusting device according to the invention.

Next, in FIG. 4, there is shown another embodiment of a camera which includes an automatic focussing adjusting device according to the invention. This embodiment is different in structure from the embodiment shown in FIG. 1 in that, in place of the correction coefficient setting circuit 80 for setting the correction coefficient $\alpha$, there is provided a correction coefficient setting circuit 100' for setting a correction coefficient $\beta$ to be described later and, following this, the control operation of the focus control device 78 is different from that in the previously disclosed embodiment. Therefore, the description of the structure other than the above-mentioned difference, which is employed in common, is now omitted.

In FIG. 4, the correction coefficient setting circuit 100' is a circuit which is used to set the correction coefficient $\beta$ for correcting an error in the amount of a de-focussing $\Delta P$ caused by the manufacturing error in the dimensions that define the positional relationship between the CCD line sensor 42 and fly eye lens group 41. In the illustrated embodiment, the circuit 100' is composed of two potentiometers 102', 104', an A/D converter 106', and an analog switch 108'.

The correction coefficient $\beta$ is set such that the difference can be minimized between the theoretical and actual values of the amount of movement $\Delta X$ of the focus lens group 2 which is necessary for focussing in a state in which the focal distance fz of of the zoom lens is fixed so that each of the zoom lenses can be brought into focus by a single AF operation. In this case, as will be discussed later, since the characteristics of the amount of movement $\Delta X$ of the focus lens group 2 with respect to the correction coefficient $\beta$ are different in the so called forward and rearward focussing states, the correction coefficient $\beta$ is modified by the potentiometer 102' for the forward focussing state, while it is modified by the potentiometer 104' for the rearward focussing state, that is, the values $\beta_1$, $\beta_2$ respectively set by the potentiometers 102', 104' are used in the operation of the amount of movement $\Delta X$.

Figure 5:
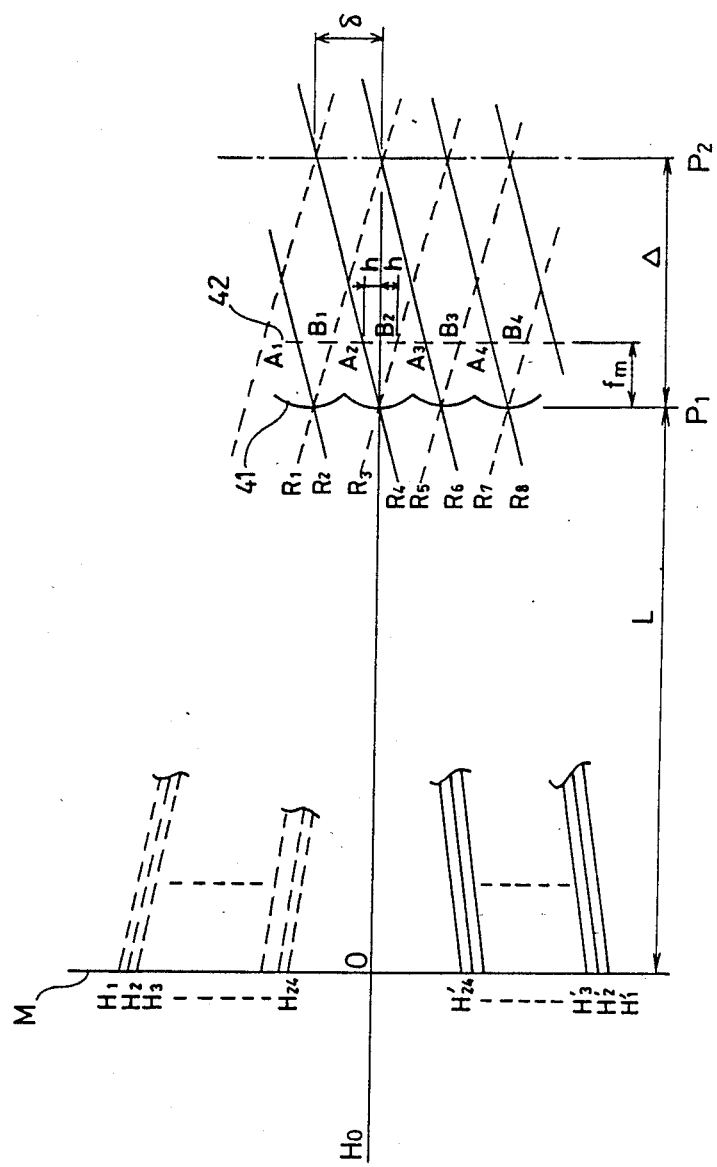
FIG. 5 is an explanatory graph showing how an exit light leaving an exit pupil surface enters a group of fly eye lenses forming a TCL module and CCD line sensors.

Next, prior to description of the control operation of the focus control device 78, the relationship between the amount of de-focussing $\Delta P$ and the correction coefficient $\beta$ with reference to FIG. 5 will be considered. In FIG. 5, there is illustrated how the light that emanates from the exit pupil surface enters the fly eye lens group 41 and CCD line sensor 42 which form the TCL module. The TCL module allows the object images, which are selected according to division of the pupil, that is, which are present in the regions of the exit pupil surface symmetric with respect to the optical axis, to be focussed on the CCD line sensor 42 through the fly eye lens group 41. By performing a correlation operation on the signals that are obtained from the CCD light receiving elements in A and B groups in the CCD line sensor 42, the focal position, that is, the amount of de-focussing $\Delta P$ can be found.

In FIG. 5, the rays of light that are emitted from points H1, H2, ..., H24 and H1', H2', ..., H24' on the exit pupil surface M pass through the field lens and, while they come near being parallel light rays, they enter the light receiving surface of the CCD line sensor 42. Here, there is obtained a relationship between a distance $\Delta$ in the case where, when the zoom lens is in focus at the position P1, the focussing position is shifted by the distance $\Delta$ in the optic axis direction, and an amount of shift $\delta$ of the same light ray on the light receiving surface of the CCD line sensor 42 that is perpendicular to the optic axis. The reason why the relationship between the distance $\Delta$ and the amount of shift $\delta$ is necessary is to examine a relationship between the amount of shift and the amount of focus shifting (amount of de-focussing) in the correlation operation as to an output waveform, which indicates the illumination distribution of the object on the light receiving surface of the CCD line sensor 42 by means of the respective light receiving elements in A group in the CCD line sensor 42, and an output indicating the illumination distribution of the object on the light receiving surface by means of the respective light receiving elements in B group.

Now, with respect to the lens optic axis Ho, the following relationship holds between the rays that are emitted from the points H1, H2, ..., H24 and H1', H2', ..., H24' on the exit pupil surface the rays R1, R2, ... that enter the light receiving surfaces of the respective light receiving elements of the CCD line sensor 42:

$$\frac{\Delta}{\delta} = \frac{L}{Hi} \tag{9}$$

where, Hi represents a distance from the optic axis Ho on the exit pupil surface.

If on the other hand, when the light ray Ri passes through the sensitivity barycenter position of a pair of light receiving elements Ai, Bi, a distance between the middle point of the pair of light receiving elements Ai, Bi and the sensitivity barycenter position of the light receiving elements Ai, Bi is expressed as h, and a distance the focal distance of each of the fly eye lenses, between the fly eye lens group 41 and the light receiving surface of the CCD line sensor 42 is expressed as fm, then the following equation is obtained:

$$\frac{fm}{h} = \frac{L}{Hi} \tag{10}$$

Further, from the equations (9), (10), the following equation is found.

$$\Delta = \frac{fm}{h} \delta \tag{11}$$

Here, assume that a light ray entering the pair of light receiving elements Ai, Bi at a certain focussing point is shifted by 1 pitch on the light receiving surface of the CCD line sensor 42, that is, it enters another pair of light receiving elements Ai+1, Bi+1 adjoining the pair of light receiving elements Ai, Bi. If the amount of de-focussing of the ray is expressed as Ko, then the following equation is found:

$$k_0 = \frac{fm}{2h} \delta_0 \tag{12}$$

where, $\delta_0$ represents a distance between the middle point of the pair of light receiving elements Ai, Bi and the pair of light receiving elements Ai+1, Bi+1 adjoining thereto.

Therefore, when the two output waveforms respectively obtained from the light receiving elements in A and B groups and representing the illumination distributions of the object are shifted by n pitches (n is not always an integral number) from each other, then the amount of de-focusing $\Delta P$ can be found as follows:

$$\Delta P = nk_0 \tag{13}$$

However, in fact, in the dimensions, that is, the focal distance fm of the each fly eye lens, the distance h between the middle point of the pair of light receiving elements Ai, Bi and the sensitivity barycenter position of these light receiving elements Ai, Bi, and the distance between the middle point of the pair of light receiving elements Ai, Bi and the pair of light receiving elements Ai+1, Bi+1 adjoining thereto, there are included errors which are produced when the TCL module is manufactured. In this case, when the amount of de-focussing is expressed by k and the above-mentioned manufacturing errors in the respective dimensions are expressed by $\Delta fm$, $\Delta h$, $\Delta \delta_0$, respectively, then k can be found as follows:

$$k = \frac{fm + \Delta fm}{2(h + \Delta h)} (\delta_0 + \Delta \delta_0) \tag{14}$$

Here, the focal distance fm of the fly eye lens is so small that it is quite difficult to obtain the positional accuracy thereof, in alignment, which has the greatest influence on the error in the amount of de-focussing. In view of this, if the correction coefficient $\beta$ is used, then k can be expressed as follows:

$$k = \beta_0 \cdot k_0 \tag{15}$$

In other words, by use of:

$$\Delta P = \Delta_0 \tag{16}$$

Then correction coefficient $\beta$ is adjusted such that the focussing can be achieved by a single AF operation. Because of this, it is possible to remove the error in the amount of de-focussing $\Delta P$ caused by the manufacturing errors in the respective dimensions, that is, fm, h, $\delta_0$ defining the positional relationship between the fly eye lens group and the light receiving element group of the CCD line sensor forming the TCL module.

The correction coefficient $\beta_o$ is an amount which can be obtained from the above-mentioned manufacturing errors of the TCL module with no further consideration. However, as will be discussed later, in case of the zoom lens, the characteristics of the amount of movement $\Delta X$ of the focus lens group necessary for focussing with respect to the amount of de-focussing $\Delta P$ are different between in the forward and rearward focussing states. For this reason, it is necessary to set two kinds of correction coefficients $\beta_1$, $\beta_2$ as a result of the different characteristics.

Figure 6:
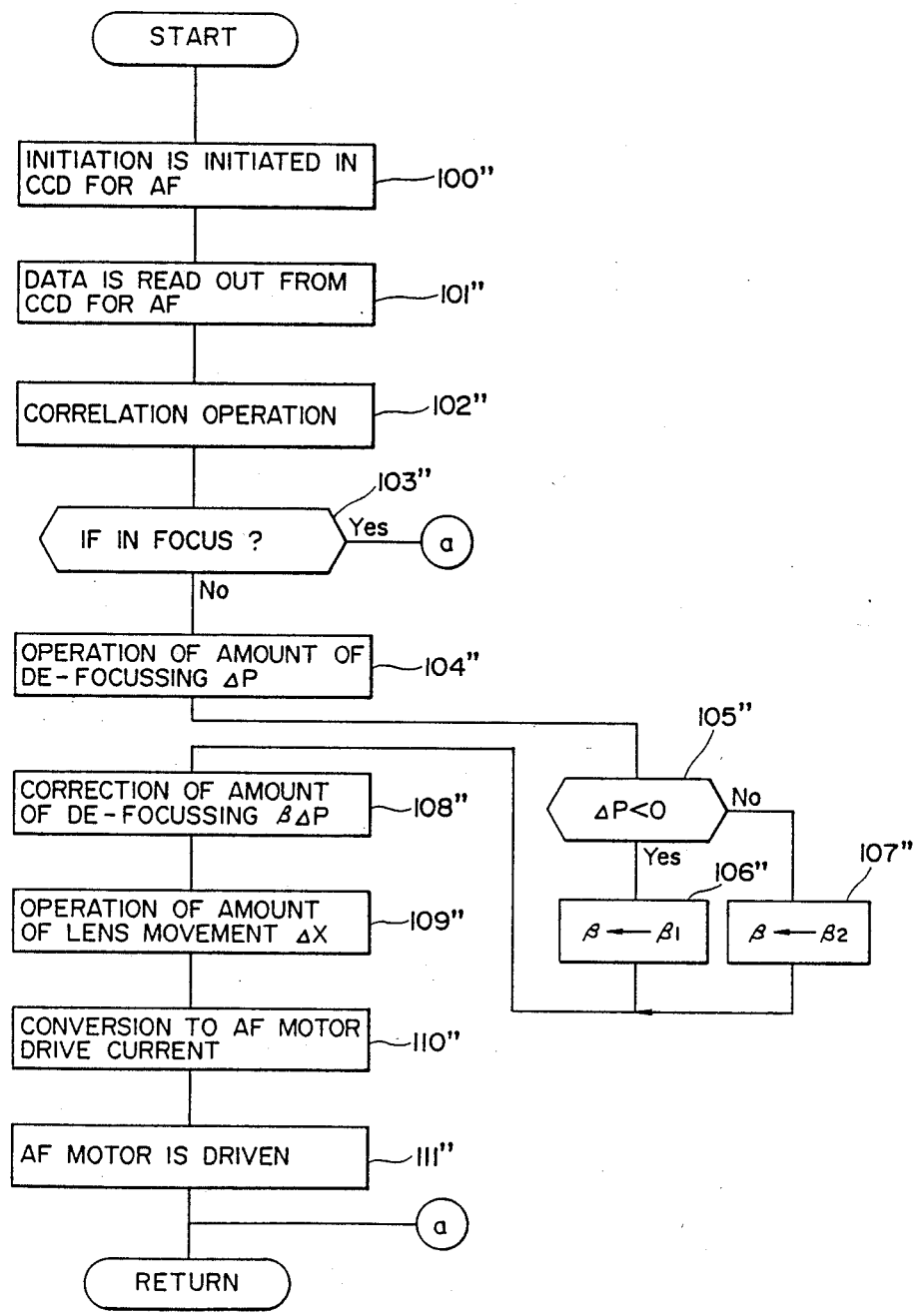
FIG. 6 is a flow chart to show the control operation of the focus control device shown in FIG. 4.

Next, with reference to FIG. 6 description will be given for the control operation that is performed by the focussing control device in the automatic focussing adjustment. In this figure, when the shutter 20 is opened by means of operation of the shutter release button in the operation part 92, then a ray having a quantity of light corresponding to the object image is allowed to enter the light receiving surfaces of the CCDs 22, 40 to open the gates of the CCDs 22, 40, so that the accumulation (integration) of the signal charges is started (Step 100'').

Further, in accordance with the principles already described in connection with FIGS. 11 and 12, the signal charges that correspond to the illumination distributions P, Q are accumulated in the respective light receiving elements in both A and B groups in the CCD line sensor 42, and are then read out therefrom (Step 101'').

Then, in accordance with the output signals of the respective light receiving elements in A and B groups in the CCD line sensor 42, a correlation operation on the illumination distributions P, Q of the object image is performed to find the amount of spatial phase shift $\delta$ (Step 102'').

Further, in Step 103'', whether the object image is in focus or not on the light receiving surface of the CCD 22, that is, whether $\delta=0$ or not is checked. If in focus, ($\delta=0$), then the AF control operation is terminated.

On the other hand, if not in focus ($\delta \neq 0$), then the amount of de-focussing $\Delta P = n \cdot k_0$ is calculated according to the two equations (17), (13) (Step 104'').

Next, in Step 105'' whether or not $\Delta P<0$ (in the forward focussing state) is checked. If $\Delta P<0$, that is, if in the forward focussing state, then the correction coefficient $\beta_1$ to be set by the potentiometer 102' is input to the focus control device 78 through the analog switch 108', A/D converter 106', and, if $\Delta P>0$, that is, if in the rearward focussing state, then the correction coefficient $\beta_2$ to be set by the potentiometer 104' is input similarly (Steps 106'', 107'').

Now the characteristics of the amount of movement $\Delta X$ of the focus lens group with respect to the correction coefficient $\beta$ will be examined. Using $\cdot P$ for P, the equation (1) can be transformed as follows:

$$\pm \Delta X = \frac{\beta \cdot \Delta P}{m^2 \mp \frac{m\Delta P}{fe} \beta} = \quad (17)$$

-continued
$$\frac{\beta \cdot \frac{fe}{m}}{\mp \beta + \frac{mfe}{\Delta P}} = \frac{-fe^2/\Delta P}{\mp \beta + \frac{mfe}{\Delta P}} \mp \frac{fe}{m}$$

In the equation, setting $fe^2/\Delta P = a$, $m/fe = b$, there results:

$$\mp \Delta X = \frac{-a}{\beta \mp ab} \mp \frac{1}{b} \quad (18)$$

Therefore, according to the equation (18), for the forward focussing state, the amount of movement $\Delta X$ of the focus lens group necessary for focussing can be found as follows:

$$\Delta X = \frac{-a}{\beta - ab} - \frac{1}{b} \quad (19)$$

Also, for the rearward focussing state, the amount of movement $\Delta X$ of the focus lens group necessary for focussing can be found as follows:

$$-\Delta X = \frac{-a}{\beta + ab} + \frac{1}{b} \quad (20)$$

Figure 7:
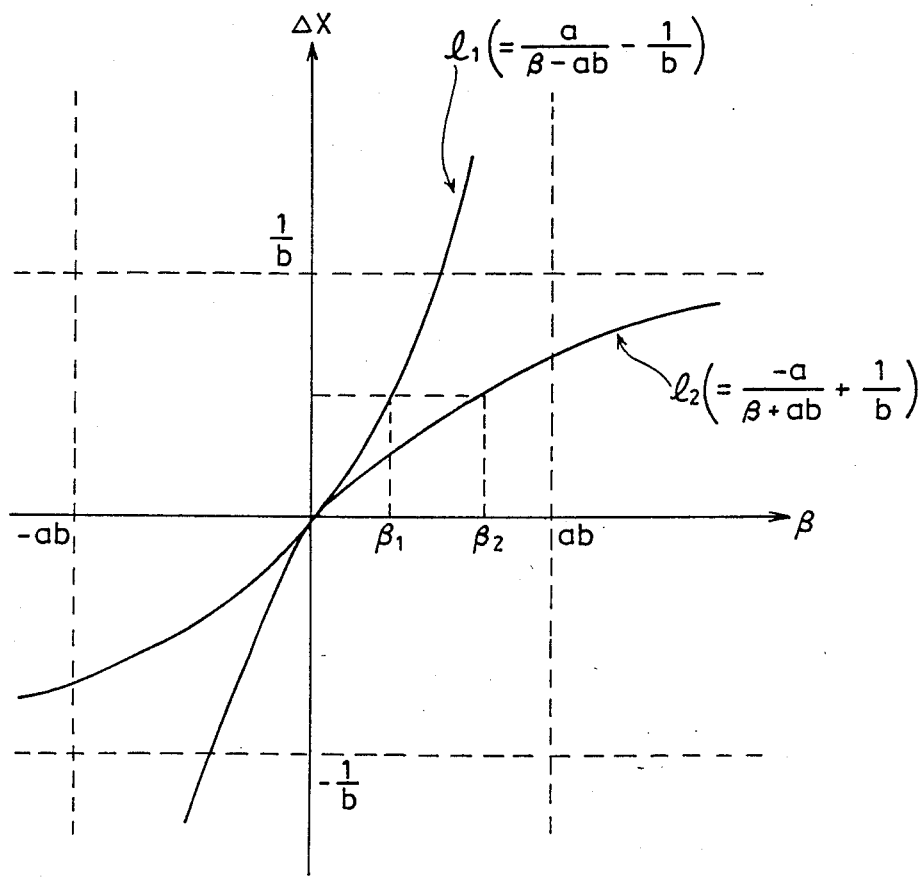
FIG. 7 is a characteristic curve showing the relationship between a correction coefficient β and the amount of movement ΔX of the focus lens group.

The characteristics of the amount of movement $\Delta X$ (absolute value) of the focus lens group with respect to the correction coefficient $\beta$ in the forward or rearward focussing state can be represented by four hyperbolas according to the equations (19) and (20). However, since the correction coefficient $\beta$ takes a positive value, actually, it can be represented by two hyperbolas $l_1$, $l_2$ shown in FIG. 7. In FIG. 7, the hyperbola (asymptotic line $\beta = ab$, $X=(1/b)$ represents the characteristic of the forward focussing state, while the hyperbola (asymptotic line $\beta = -ab$, $\Delta X=(1/b)$ represents the characteristic of the rearward focussing state.

As can be seen clearly from the FIG. 7, since in the forward and rearward focussing states the characteristics of the amount of movement $\Delta X$ necessary focussing of the focus lens group 2 with respect to the correction coefficient $\beta$ are different from each other, it is necessary to select the different correction coefficients $\beta_1$, $\beta_2$ according to the respective focussing states.

Next, in Step 108'', in accordance with the correction coefficient set by the correction coefficient setting circuit 100' in Steps 106'', 107'', the amount of de-focussing $\beta \cdot \Delta P (=\beta \cdot nko)$ is calculated in which the error caused by the manufacturing errors of the TCL module and included in the amount of de-focussing $\Delta P$ calculated in Step 104'' is corrected.

Further, in Step 109'' the amount of movement $\Delta X$ of the focus lens group 2 necessary to bring the zoom lens into focus is calculated. Here, since the amount of de-focussing $\beta \cdot \Delta P$ (actually, $\beta \cdot \Delta P$ or $\beta \cdot \Delta P$) calculated in Step 108'' is used, the amount of movement can be found as follows:

$$\Delta X = \frac{\beta \cdot \Delta P}{m^2 \mp \frac{m\Delta P}{fe} \beta} \quad (17)$$

The focus control device 78 retrieves from the ROM table the focus fz of the zoom lens obtained from the zoom detect device 46 to obtain the data on the magnification m of the magnification varying lens group and the focal distance fe, and also takes in the operation result ($\beta \cdot \Delta P$) in Step 108″ to thereby calculate the amount of movement $\Delta X$ of the focus lens group.

The amount of movement $\Delta X$ of the focus lens group 2 is converted to the drive current value of the DC motor 52 for driving the focus lens group 2, and a control signal, which is used to supply the DC motor 52 from the motor drive circuit 68 with the current that corresponds to the drive current value, is output from the focus control device 78 to the motor drive circuit 68, whereby the automatic focussing adjustment can be achieved (Steps 110″, 111″).

In the present embodiment, the correction coefficient setting circuit 100′ is realized by the potentiometers and A/D converter. However, this is not always limitative, for example, the correction coefficient $\beta$ may be set by use of a dip switch and also it may be input to the focus control device 78 in the form of a digital signal.

In the present embodiment, due to the fact that the correction coefficient $\beta$ can take different values in the forward and rearward focussing states, the error in the amount of movement $\Delta X$ of the focus lens group necessary for focussing can be further minimized.

Further, although a description has been given of a typical application of the invention to the camera using the zoom lens in the present embodiment, the present invention is not limited to this, since it can also apply to a camera which does not use the zoom lens but employs an ordinary taking lens.

As described above, since the invention is constructed such that, with respect to the amount of de-focussing $\Delta P$ which is one of parameters of the amount of movement $\Delta X$ of the taking lens necessary for focussing in performing the automatic focussing adjustment, the error caused by the positional errors (manufacturing errors) of the microscopic lens group and two line sensors which are respectively components of the focus detect element such as a TCL module or the like can be duly corrected, it is possible to remove the error in the amount of de-focussing $\Delta P$ caused by the above-mentioned manufacturing errors of the focus detect element and, in its turn, the error in the amount of movement $\Delta X$ of the taking lens. Therefore, according to the invention, the automatic focussing adjustment can be performed at high speeds even when the error in the above-mentioned amount of de-focussing $\Delta P$ is large.

Figure 8:
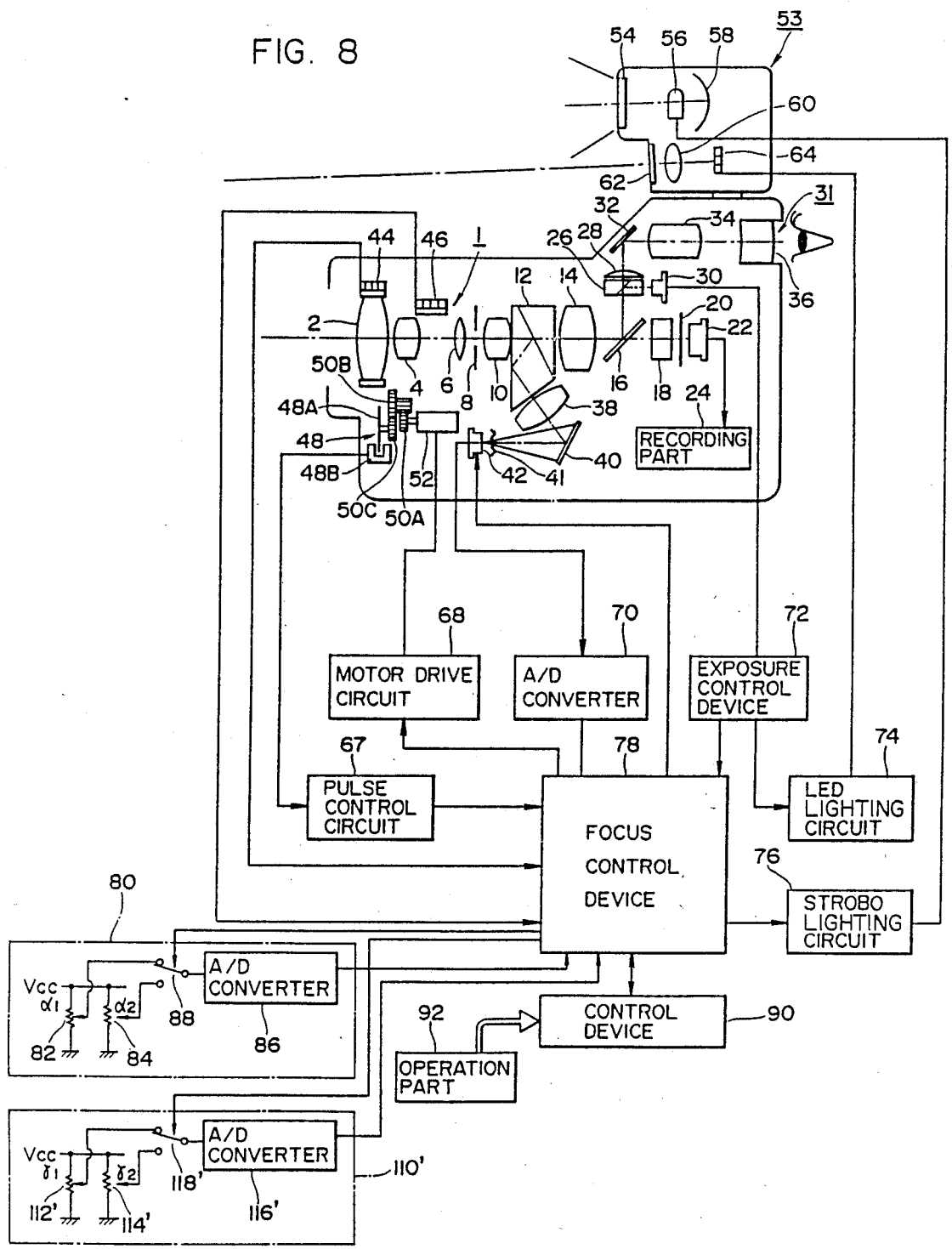
FIG. 8 is a block diagram of the structure of still another embodiment of a camera including an automatic focussing adjusting device according to the invention.

Now, referring to FIG. 8, shown is still another embodiment of a camera which includes an automatic focussing adjusting device according to the invention. The present embodiment is different in construction from the before-mentioned first embodiment in that, in addition to the correction coefficient setting circuit 80 for setting the correction coefficient $\alpha$, there is now provided a correction coefficient setting circuit 110′ for setting a correction coefficient $\gamma$, and that, with the provision of the correction coefficient setting circuit 110′, the control operation of the focus control device 78 is modified accordingly. The remaining portions of the construction of the present embodiment are similar to those in the first embodiment and, therefore, the description thereof is not repeated.

In FIG. 8, the correction coefficient setting circuit 110′ is a circuit to set the correction coefficient $\gamma$ for correcting or removing the influence of the error in the amount of de-focussing $\Delta P$, the error in the magnification m of the magnification varying lens group as well as by the manufacturing errors in the dimensions defining the position relationship between the CCD line sensor 42 and the fly eye lens group 41, in response to the amount of movement $\Delta X$ of the focus lens group. In this embodiment, the circuit 110′ comprises potentiometers 112′, 114′, and A/C converter 116′ for converting the output signals of the potentiometers 112′, 114′ from analog to digital, and an analog switch 118′.

The correction coefficient $\gamma$, which is similar to the correction coefficient $\alpha$, is set such that a difference between the theoretical and actual values of the amount of movement $\Delta X$ of the focus lens group 2, with the focal distance fz of the zoom lens being fixed at a given value, can be minimized so as to be able to achieve focussing by a single AF operation for each of the zoom lenses. In this case, as will be discussed later, since the amount of movement $\Delta X$ of the focus lens group 2 with respect to the correction coefficient $\gamma$ provides different characteristics according to either a forward and rearward focussing state, a value $\gamma_1$ set by the potentiometer 112′ is used for operation of the amount of movement $\Delta X$ for the forward focussing state, while a value $\gamma_2$ set by the potentiometer 114 is employed for the rearward focussing state.

Figure 9:
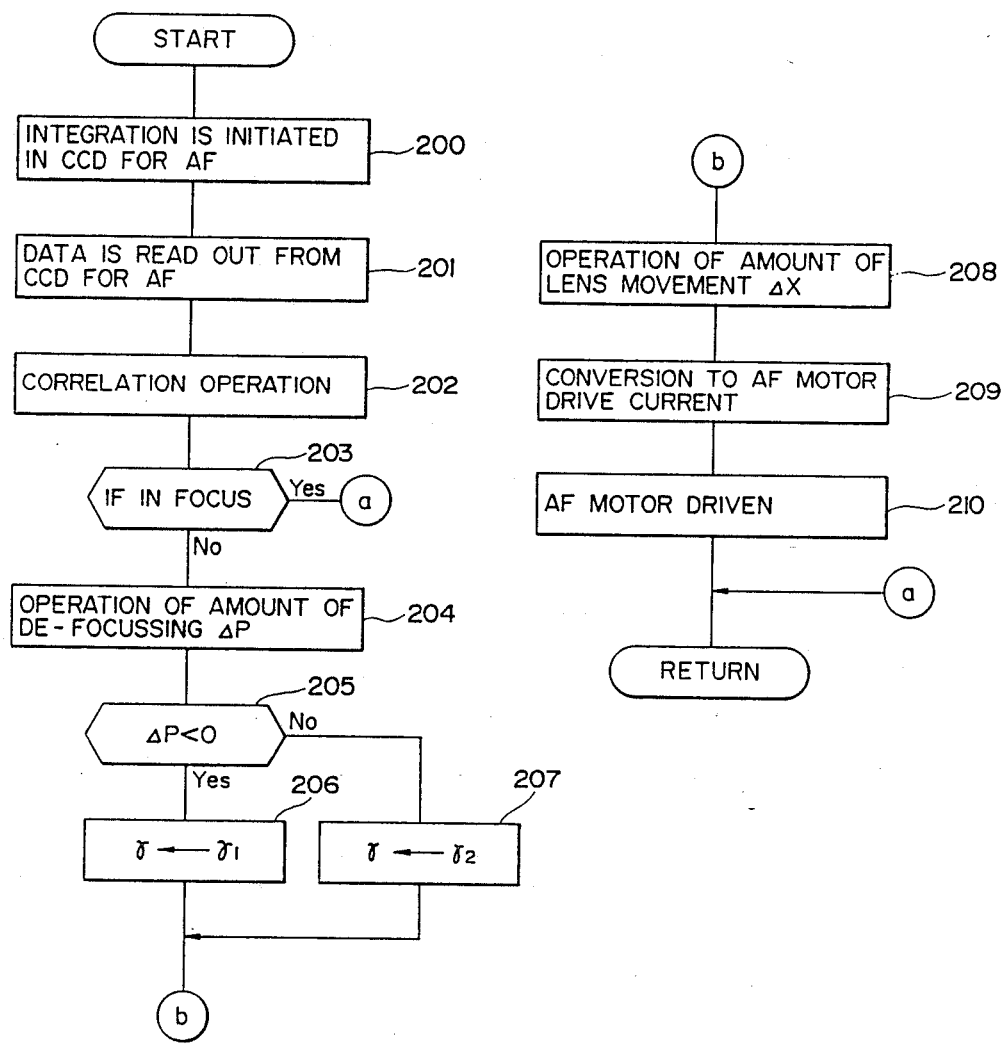
FIG. 9 is a flow chart to show the control operation of a focus control device shown in FIG. 8.

Next, a description will be given of the control operation that is performed by the focus control device in the automatic focussing adjustment with reference to FIG. 9. Here, a case is discussed where the automatic focussing adjustment is executed in the approximation of $\alpha \simeq 1$ in the equation (5). In FIG. 9, if the shutter 20 is released by means of operation of the shutter release button in the operation part 92, then a ray having a quantity of light corresponding to the object image is allowed to enter the light receiving surfaces of the CCD 22 and 40 to open the gates of the CCDs 22 and 40, thereby starting the accumulation (integration) of the signal charges (Step 200).

And, in accordance with the principles already described in connection with FIGS. 11 and 12, the signal charges that correspond to the illumination distributions P, Q are accumulated in the respective light receiving elements in both A and B groups in the CCD line sensor 42 and are then read out therefrom (Step 201).

Next, in accordance with the output signals of the respective light receiving elements in A and B groups in the CCD line sensor 42 mentioned above, a correlation operation is carried out on the illumination distributions P, Q of the object image to thereby find the amount of spatial phase shift (Step 202).

Further, in Step 203, whether or not the object image is in focus on the light receiving surface of the CCD 22, that is, whether or not $\delta = 0$ is checked. If in focus ($\delta = 0$), then the AF control operation is terminated. On the contrary, if not in focus ($\delta \neq 0$), then the amount of de-focussing $\Delta P$ is calculated (Step 204).

Then, in Step 205, whether or not $\Delta P < 0$ (in the forward focussing state) is checked. If $\Delta P < 0$, that is, in the forward focussing state, then the correction coefficient $\gamma_1$ to be set by the potentiometer 112′ is input through the analog switch 118′ and A/D converter 116′ to the focus control device 78, while, if $\Delta P > 0$, that is, in the rearward focussing state, then the correction coefficient $\gamma_2$ to be set by the potentiometer 114′ is likewise input to the device 78 (Steps 206, 207).

Setting $\Delta P = K$, $m^2 = a$, $(m\Delta P / fe = b)$ in the equation (6), then the following equation obtained:

$$\Delta X = \frac{K}{a\gamma \mp b} \quad (21)$$

In the equation (6), the sign of the denominator is— for the forward focussing state, while it is + or the rearward focussing state.

Figure 10:
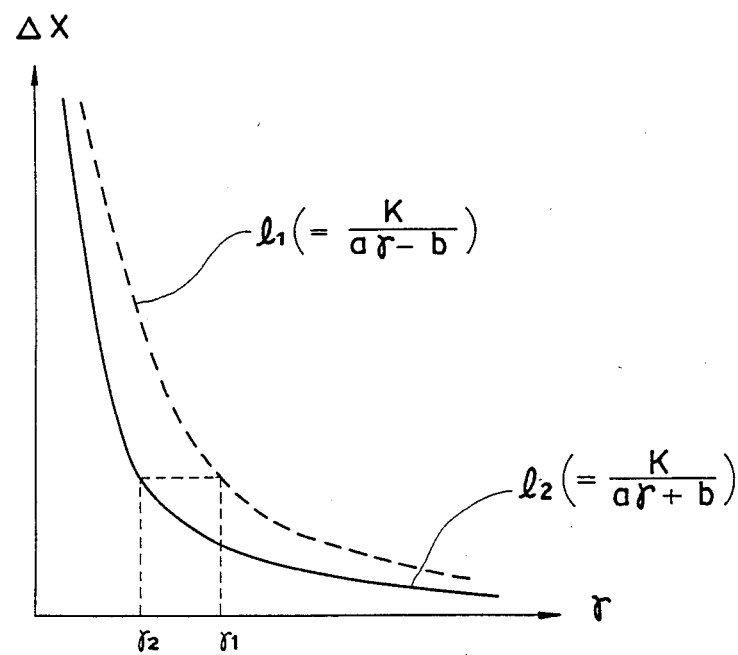
FIG. 10 is a characteristic curve illustrative of the relationship between a correction coefficient γ and the amount of movement ΔX of the focus lens group.

Therefore, the two hyperbolas $l_1$, $l_2$ respectively shown in FIG. 10 are obtained. The hyperbola $l_1$ representing the characteristic of the forward focussing state can be stated by the equation:

$$\Delta X = \frac{K}{a\gamma - b} \quad (22)$$

while the hyperbola representing the characteristic of the rearward focussing state can be stated by the equation:

$$\Delta X = \frac{K}{a\gamma + b} \quad (23)$$

As can be seen clearly from FIG. 10, the amount of movement $\Delta X$ necessary for focussing of the focus lens group 2 with respect to the correction coefficient $\gamma$ provides different characteristics for the forward and rearward focussing states and, therefore, it is necessary to select different correction coefficients $\gamma_1$, $\gamma_2$ according to the respective focussing states.

The focus control device 78 retrieves from the ROM table the focal distance fz of the zoom lens obtained from the zoom detect part 46 to thereby obtain the data on the magnification m of the magnification varying lens group and the focal distance fe and, by setting the correction coefficient $\gamma = \gamma_1$ or $\gamma = \gamma_2$, operates the amount of movement of the focus lens group 2 according to the equation (5) (Steps 206, 207, 208).

The amount of movement $\Delta X$ of the focus lens group 2 is then converted to the drive current value of the DC motor 52 for driving the focus lens group 2, and a control signal, which allows the drive circuit 68 to supply the DC motor 52 with the current that corresponds to the above drive current value, is output from the focus control device 78 to the motor drive circuit 68, so that the automatic focussing adjustment can be achieved (Steps 209, 210).

As described above, in the present embodiment, the correction coefficient setting circuits 80 and 110' are realized by combining a potentiometer with an A/D converter. However, the invention is not limited to this, since, for example, the correction coefficient $\gamma$ can be set by use of a dip switch and then can be input to the focus control device in the form of a digital signal.

According to the present embodiment, the correction coefficient $\gamma$ can take different values for the forward and rearward focussing states and, therefore, the error in the amount of movement $\Delta X$ of the focus lens group necessary for focussing can be further minimized.

As has been described hereinbefore, the invention is structured such that the influence of the error in the amount of de-focussing $\Delta P$, which is caused by the error in the magnification m of the magnification varying lens group and by the manufacturing errors in the dimensions defining the positional relationship between the light receiving elements and microscopic lens group in the focus detect means, on the amount of movement $\Delta X$ of the focus lens group necessary for focussing in performing the automatic focussing adjustment can be removed by means of the correction operation based on the set value of the correction coefficient setting means. Therefore, according to the present invention, even when the error in the magnification m of the magnification varying lens group and the error in the above-mentioned amount of de-focussing $\Delta P$ are large, the automatic focussing adjustment can be carried out at relatively high speeds.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An automatic focussing adjusting device comprising: focus detect means for detecting the state of forming of an image of an object on the focal plane which is formed by the incident light of a zoom lens; lens drive means for driving a group of focus lenses in said zoom lens; and control means for calculating an amount of de-focussing $\Delta P$ in accordance with the detect output of said focus detect means, for finding the amount of movement $\Delta X$ of said focus lens group necessary for focussing on said focal plane according to said amount of de-focussing $\Delta P$, the magnification m of a group of magnification varying lenses in said zoom lens and the focal distance thereof fe, and for outputting to said lens drive means a control signal to move said focus lens group by said amount of movement $\Delta X$, said control means further including correction coefficient setting means for setting a correction coefficient $\alpha$ for the magnification m of said magnification varying lens group, said control means generating and using the factor $\alpha \cdot m$ in place of the magnification m of said magnification varying lens group for calculating said control signal to move said focus line group by said amount of movement $\Delta X$.

2. An automatic focussing adjusting device as set forth in claim 1, wherein said correction coefficient $\alpha$ provides different values according to whether a plane on which said object image is formed is present in front of or in the rear of said focal plane.

3. An automatic focussing adjusting device as set forth in claim 1, wherein said correction coefficient setting means comprises a first potentiometer for setting a correction coefficient $\alpha_1$ for the magnification m of said magnification varying lens group when said object image formation plane is present in front of said focal plane, a second potentiometer for setting a correction coefficient $\alpha_2$ for the magnification m of said magnification varying lens group when said object image formation plane is in the rear of said focal plane, an analog switch for switching the set outputs of said first and second potentiometers, and an A/D converter for converting the set output of said first or second potentiometer input through said analog switch from analog to digital.

4. An automatic focussing adjusting device as set forth in claim 1, wherein said control means calculates the amount of de-focussing $\Delta X$ of said focus lens group from said amount of de-focussing $\Delta P$, magnification m of said magnification varying lens group of said zoom lens, focal distance fe of said magnification varying lens group, and correction coefficient $\alpha$ according to the following equation:

$$\pm \Delta X = \frac{\Delta P}{\alpha m^2 \mp \frac{\alpha m \cdot \Delta P}{fe}}$$

5. An automatic focussing adjusting device comprising: two line sensors for outputting the electric signals that correspond to the illumination distributions of an image of an object formed on the light receiving surfaces thereof; a group of microscopic lenses for forming the image of said object on said two line sensors, said object image being formed by the light that has passed through two portions symmetric with respect to an optic axis on the exit pupil surface of a taking lens; and control means for converting the amount of shift between the illumination distributions of said object image on said light receiving surfaces of said two line sensors to an amount of de-focussing with respect to the focal plane of said taking lens, and for performing a focus control operation in accordance with said amount of de-focussing, said control means further including correction coefficient setting means for setting a correction coefficient $\beta$ to correct the error in said amount of defocussing that is caused by the variations of dimensions defining a mutual positional relationship between said microscopic lens group and said two line sensors, said control means utilizing said correction coefficient to perform a focus control operation in accordance with said corrected amount of de-focussing.

6. An automatic focussing adjusting device as set forth in claim 5, wherein said correction coefficient setting means allows said correction coefficient $\beta$ to be set to provide different values according to whether the image formation position of said taking lens is present in front of or in the rear of said focal plane.

7. An automatic focussing adjusting device as set forth in claim 5, wherein said correction coefficient setting means comprises a first potentiometer for setting a correction coefficient $\beta_1$ to correct the error in said amount of de-focussing that is caused by the variations of dimensions defining a mutual positional relationship between said microscopic lens group and said two line sensors when said image formation plane of said object is present in front of said focal plane, a second potentiometer for setting a correction coefficient $\beta_2$ to correct the error in said amount of de-focussing that is caused by the variations of dimensions defining a mutual positional relationship between said microscopic lens group and said two line sensors when said object image formation plane is present in the rear of said focal plane, an analog switch for switching the set outputs of said first and second potentiometers, and an A/D converter for converting the set output of said first or second potentiometer input through said analog switch from analog to digital.

8. An automatic focussing adjusting device as set forth in claim 5, wherein said control means calculates the amount of de-focussing $\Delta X$ of said focus lens group from said amount of defocussing $\Delta P$, magnification m of said magnification varying lens group of said zoom lens, focal distance fe of said magnification varying lens group, and correction coefficient $\beta$ according to the following equation:

$$\pm \Delta X = \frac{\beta \cdot \Delta P}{m^2 \mp \frac{m \cdot \beta \Delta P}{fe}}$$

9. An automatic focussing adjusting device comprising: focus detect means including a group of light receiving elements arranged linearly at given intervals and a group of microscopic lenses disposed in front of said light receiving elements and spaced by fixed distances from said light receiving elements in a direction of the optic axis of an optical system for focus adjustment for detecting the state of an image of an object on a focal plane which is formed by the incident light of a zoom lens; lens drive means for driving a group of focus lenses in said zoom lens; and control means for calculating an amount of de-focussing $\Delta P$ in accordance with the detect output of said focus detect means, for finding the amount of movement $\Delta X$ of said focus lens group necessary for focussing on said focal plane according to said amount of de-focussing $\Delta P$, the magnification m of a group of magnification varying lenses in said zoom lens and the focal distance fe thereof, and for outputting to said lens drive means a control signal to move said focus lens group by said amount of movement $\Delta X$, said control means further including a first correction coefficient setting means for setting a correction coefficient $\gamma$ for the magnification m of said magnification varying lens group, and a second correction coefficient setting means for setting a correction coefficient to correctively eliminate the influence of an error in said amount of de-focussing $\Delta P$ on said amount of movement $\Delta X$, said error being caused by error in the magnification m of said magnification varying lens group and by manufacturing errors in dimensions defining a positional relationship between said light receiving element group and said microscopic lens group in said focus detect means, said control means performing a correction operation in response to said correction coefficients $\alpha$ and $\gamma$ to thereby compensate for the amount of movement $\Delta P$ of said focus lens group.

10. An automatic focussing adjusting device as set forth in claim 9, wherein each of said correction coefficients $\alpha$, $\gamma$ can provide different values according to whether said image formation plane of said object is present in front of or in the rear of said focal plane.

11. An automatic focussing adjusting device as set forth in claim 9, wherein said first correction coefficient setting means comprises a first potentiometer for setting a correction coefficient $\alpha_1$ for the magnification m of said magnification varying lens group when said object image formation plane is present in front of said focal plane, a second potentiometer for setting a correction coefficient $\alpha_2$ for the magnification m of said magnification varying lens group when said object image formation plane is present in the rear of said focal plane, an analog switch for switching the set outputs of said first and second potentiometers, and an A/D converter for converting the set output of said first or second potentiometer input through said analog switch from analog to digital.

12. An automatic focussing adjustment device as set forth in claim 9, wherein said second correction coefficient setting means comprises a first potentiometer for setting a correction coefficient $\gamma_1$ to correctively remove the influence of an error in said amount of de-focussing $\Delta P$ on said amount of movement $\Delta X$ when said image formation plane of said object is present in front of said focal plane, said error being caused by an error in the magnification m of said magnification varying lens group and by manufacturing errors in dimensions defining a positional relationship between said light receiving element group and said microscopic lens group in said focus detect means, a second potentiometer for setting a correction coefficient $\gamma_2$ to correctively remove the influence of an error in said amount of de-focussing $\Delta P$ on said amount of movement $\Delta X$ when said object image formation plane is present in the rear of said focal plane, said error being caused by an error in the magnification m of said magnification varying lens group and by manufacturing errors in dimensions defining a positional relationship between said light receiving element group and said microscopic lens group in said focus detect means, an analog switch for switching the set outputs of said first and second potentiometers, and an A/D converter for converting the set output of said first or second potentiometer from analog to digital.

13. An automatic focussing adjusting device as set forth in claim 9, wherein said control means calculates the amount of movement $\Delta X$ of said focus lens group from said amount of de-focussing $\Delta P$, magnification m of said magnification varying lens of said zoom lens, focal distance fe of said magnification varying lens group, and correction coefficients $\alpha$, $\gamma$ according to the following equation:

$$\pm \Delta X = \frac{\Delta P}{\gamma m^2 \mp \frac{\alpha m \cdot \Delta P}{fe}}$$

14. An automatic focussing adjusting device comprising: focus detecting means including a group of light receiving elements arranged linearly at given intervals and a group of microscopic lenses disposed in front of said light receiving elements and spaced by fixed distances from said light receiving elements in a direction of the optic axis of an optical system for focus adjustment for detecting the state of an image of an object on a focal plane which is formed by the incident light on a zoom lens; lens driving means for driving a group of focus lenses in said zoom lens; and control means for calculating an amount of de-focussing $\Delta P$ in accordance with the detect output of said focus detect means, for finding the amount of movement $\Delta X$ of said focus lens group necessary for focussing on said focal plane according to said amount of de-focussing $\Delta P$, the magnification m of a group of magnification varying lenses in said zoom lens and the focal distance fe thereof, and for outputting to said lens drive means a control signal to move said focus lens group by said amount of movement $\Delta X$; said control means further including correction coefficient setting means for setting a correction coefficient $\delta$ to correctively remove the influence of an error in said amount of de-focussing $\Delta P$ on said amount of movement $\Delta X$, said error being caused by an error in the magnification m of said magnification varying lens group and by manufacturing errors in dimensions defining a positional relationship between said light receiving element group and said microscopic lens group in said focus detect means, said control means performing a correction operation in response to said correction coefficient to compensate for the amount of movement $\Delta X$ of said focus lens group.

15. An automatic focussing adjusting device as set forth in claim 14, wherein said correction coefficient provides different values according to whether said image formation plane of said object is present in front of or in the rear of said focal plane.

16. An automatic focussing adjusting device as set forth in claim 14, wherein said correction coefficient setting means comprises a first potentiometer for setting a correction coefficient $\gamma_1$ to correctively remove the influence of an error in said amount of de-focussing $\Delta P$ on said amount of movement $\Delta X$ when said object image formation plane is present in front of said focal plane, said error being caused by an error in the magnification m of said magnification varying lens group and by manufacturing errors in dimensions defining a positional relationship between said light receiving element group and said microscopic lens group in said focus detect means, a second potentiometer for setting a correction coefficient $\gamma_2$ to correctively remove the influence of an error in said amount of de-focussing $\Delta P$ on said amount of movement $\Delta X$ when said object image formation plane is present in the rear of said focal plane, said error being caused by an error in the magnification m of said magnification varying lens group and by manufacturing errors in dimensions defining a positional relationship between said light receiving element group and said microscopic lens group in said focus detect means, an analog switch for switching the set outputs of said first and second potentiometers, and an A/D converter for converting the set output of said first or second potentiometer input through said analog switch from analog to digital.

17. An automatic focussing adjusting device as set forth in claim 14, wherein said control means calculates the amount of movement X of said focus lens group from said amount of de-focussing P, magnification m of said magnification varying lens group of said zoom lens, focal distance fe of said magnification varying lens group, and correction coefficient, according to the following equation:

$$\pm \Delta X = \frac{\Delta P}{\gamma m^2 \mp \frac{m \cdot \Delta P}{fe}}$$

* * * * *